(12) United States Patent
Chen et al.

(10) Patent No.: US 10,477,286 B2
(45) Date of Patent: Nov. 12, 2019

(54) STREAMING MEDIA FILE PROCESSING METHOD AND LIVE STREAMING SYSTEM

(71) Applicant: WANGSU SCIENCE & TECHNOLOGY CO., LTD., Shanghai (CN)

(72) Inventors: Hong Chen, Shanghai (CN); Shibiao L V, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 58 days.

(21) Appl. No.: 15/739,956

(22) PCT Filed: Jul. 13, 2017

(86) PCT No.: PCT/CN2017/092773
§ 371 (c)(1),
(2) Date: Dec. 26, 2017

(87) PCT Pub. No.: WO2018/232796
PCT Pub. Date: Dec. 27, 2018

(65) Prior Publication Data
US 2018/0376223 A1    Dec. 27, 2018

(30) Foreign Application Priority Data

Jun. 19, 2017   (CN) .......................... 2017 1 0464872

(51) Int. Cl.
*H04N 21/845*   (2011.01)
*H04N 21/262*   (2011.01)
(Continued)

(52) U.S. Cl.
CPC ......... *H04N 21/8456* (2013.01); *H04L 47/34* (2013.01); *H04L 65/4084* (2013.01);
(Continued)

(58) Field of Classification Search
CPC ......... H04N 21/23109; H04N 21/8456; H04N 21/8547
See application file for complete search history.

(56) References Cited

U.S. PATENT DOCUMENTS

2011/0022471 A1* 1/2011 Brueck ................. G06Q 30/02
                                                                    705/14.61
2013/0173819 A1* 7/2013 Lee .................. H04N 21/23418
                                                                    709/231
(Continued)

OTHER PUBLICATIONS

The European Patent Office (EPO) The Extended European Search Report for 17849890.3 dated Jul. 3, 2018 7 Pages.

*Primary Examiner* — Hsiungfei Peng
*Assistant Examiner* — Fred Peng
(74) *Attorney, Agent, or Firm* — Anova Law Group PLLC

(57) ABSTRACT

A streaming media file processing method and a live streaming system are provided. The method includes slicing a streaming media file into slices according to a preset time unit; creating a playing sequence number for each slice based on time data, where the playing sequence number is used to determine an order of playing back the slices; and storing the slices and the playing sequence numbers of the slices separately and establishing a mapping relationship between the slices and the corresponding playing sequence numbers. The present disclosure slices the streaming media file based on the preset time unit, and creates the playing sequence number for each slice based on time data, and selects and processes the slice file corresponding to the playing sequence number based on the time information, which facilities the subsequent operation to the slice file. In addition, the present disclosure also provides a live streaming system.

17 Claims, 4 Drawing Sheets

(51) Int. Cl.
*H04N 21/234* (2011.01)
*H04N 21/231* (2011.01)
*H04N 21/2187* (2011.01)
*H04N 19/172* (2014.01)
*H04N 21/8547* (2011.01)
*H04L 12/801* (2013.01)
*H04L 29/06* (2006.01)

(52) U.S. Cl.
CPC ......... *H04N 19/172* (2014.11); *H04N 21/845* (2013.01); *H04N 21/8547* (2013.01)

(56) References Cited

U.S. PATENT DOCUMENTS

| | | | |
|---|---|---|---|
| 2014/0032777 A1* | 1/2014 | Yuan | H04L 67/26 709/231 |
| 2015/0229688 A1 | 8/2015 | Zhou | |
| 2016/0308934 A1* | 10/2016 | Gholmieh | H04L 67/02 |
| 2017/0171276 A1 | 6/2017 | Liu et al. | |
| 2017/0188059 A1* | 6/2017 | Major | H04N 21/2402 |
| 2017/0188071 A1* | 6/2017 | Fuller | H04N 21/26258 |

* cited by examiner

STREAMING MEDIA FILE PROCESSING METHOD AND LIVE STREAMING SYSTEM

CROSS-REFERENCE TO RELATED APPLICATIONS

This application is a national phase entry under 35 U.S.C § 371 of International Application No. PCT/CN2017/092773 filed on Jul. 13, 2017, which claims priority of Chinese Patent Application No. 201710464872.7, filed with the State Intellectual Property Office of P. R. China on Jun. 19, 2017, the entire contents of all of which are incorporated herein by reference.

FIELD OF THE DISCLOSURE

The present disclosure generally relates to the live streaming technology and, more particularly, relates to a streaming media file processing method and a live streaming system.

BACKGROUND

As Internet is widely used, the need of transmitting audio-video signals over Internet is increasing. Radio, television, and other media are moved to online to distribute the audio-video programs over the Internet. However, when the audio-video programs are stored, the sizes of audio-video files are often huge. Under the circumstance of still limited network bandwidth, spending tens of minutes or even longer waiting for transferring an audio or video file is not a desired user experience.

The introduction of streaming media technology eases the burden of transferring audio-video contents over Internet to a certain extent.

Using the streaming media technology to transfer audio, video, or animation contents from a server to a user computer may be continuous and uninterrupted. The user may not need to wait for the completion of downloading an entire file. After a few seconds or over ten seconds of delay at the beginning, the user may view the content. When the audio-video content is played on the user's device, the remaining portion of the file may continue to be downloaded from the server.

Currently, the streaming media technology is widely used in on-demand services. That is, the audio-video file has already been stored on a server. While the content of the file is played, a user may drag to play at any position of the content of the file. To support the drag-to-play function, the streaming media file needs to be pre-processed. For example, the streaming media file may be marked with streaming timestamps. Finding a position in the content file may be conducted through locating a streaming timestamp in the streaming content file. Alternatively, the streaming media file may be sliced by key image frames such that user may find a position more precisely in the streaming content file. The server may rapidly jump to the requested position in response to the user's request.

However, the described pre-processing methods of the streaming media files may not be suitable for live streaming. When viewing live streaming images, user may not be able to perform the drag-to-play operation on the live streaming content. The user's device may receive the live streaming content in real-time from a source terminal or a server, and may self-adjust according to the status of the user's player client.

As we all know, the real-time requirement for playing audio-video content is high in the live streaming. How to process media files to provide desired viewing experience to the client may be a problem that requires a solution urgently.

BRIEF SUMMARY OF THE DISCLOSURE

To solve issues in the existing technology, the present disclosure provides a streaming media file processing method, comprising: slicing a streaming media file into slices according to a preset time unit; creating a playing sequence number for each slice based on time data, where the playing sequence number is configured to determine an order of playing the slices; and storing the slices and the playing sequence numbers of the slices separately and establishing a mapping relationship between the slices and the corresponding playing sequence numbers.

Optionally, slicing the streaming media file into slices according to the preset time unit includes: obtaining a duration for each frame in the streaming media file; and based on the duration and the preset time unit, obtaining the slice by slicing the streaming media file into the slices.

Optionally, the time data includes a streaming timestamp of a first frame in the slice.

Optionally, creating a playing sequence number for the slice based on the time data includes: applying the time data into a predetermined function to calculate the playing sequence number based on the time data.

Optionally, creating a playing sequence number for the slice based on the time data further includes: determining whether a calibration is required for a currently created playing sequence number; when it is determined that a calibration is required, creating the playing sequence number for the current slice according to the system time; and when it is determined that no calibration is required, applying the time data into a predetermined function to calculate the playing sequence number.

Optionally, determining whether calibration is required for currently created playing sequence number includes: determining whether loss of data occurs between a current slice and a preceding slice; and when it is determined that loss of data has occurred, determining that a calibration is required.

Optionally, playing the steaming media file includes: retrieving a latest playing sequence number; determining whether pausing occurs based on a playing sequence number of the currently played slice and the latest playing sequence number; when it is determined that the pausing has occurred, determining a next playing sequence number based on a playing delay and the latest playing sequence number; when it is determined that no pausing has occurred, determining the next playing sequence number based on the order of playing sequence numbers; and downloading a slice corresponding to the next playing sequence number.

Optionally, determining whether pausing occurs includes: calculating a numerical difference between the playing sequence number of the currently played slice and the latest playing sequence number; and determining whether pausing occurs by determining whether the numerical difference is within a preset range.

Optionally, after the streaming media file is sliced into slices, recording whether each of the slices includes a key frame.

Another aspect of the present disclosure provides a live streaming system, comprising a push-stream terminal, a server, and a player. The push-stream terminal transfers a streaming media file to the server. A file processing module of the server receives the streaming media file, slices the received streaming media file into slices according to a present time unit, creates a playing sequence number for each divided slice based on time data, establishes mapping relationship between the slices and the corresponding playing sequence numbers, and respectively sends the slices, the playing sequence numbers of the slices, and the mapping relationship to a storage module of the server. The storage module stores the slices in a first section, and the playing sequence numbers of the slices and the mapping relationship in a second section. The player obtains and selects the playing sequence number from the second section, and downloads and plays a slice from the first section based on the playing sequence number and the mapping relationship.

Optionally, slicing the streaming media file into slices by the file processing module of the server according to a present time unit includes: obtaining a duration for each frame in the steaming media file; and obtaining the slice by slicing the streaming media file based on the frame durations and the preset time unit.

Optionally, the time data includes a streaming timestamp of a first frame in the slice.

Optionally, creating a playing sequence number for the slice by the file processing module of the server based on time data includes: applying the time data into a predetermined function to calculate the playing sequence number based on the time data.

Optionally, creating a playing sequence number for the slice by the file processing module of the server based on time data further includes: determining whether a calibration is required for a currently created playing sequence number; when it is determined that a calibration is required, creating the playing sequence number for the current slice according to the system time; and when it is determined that no calibration is required, applying the time data into a predetermined function to calculate the playing sequence number.

Optionally, determining by the file processing module whether a calibration is required for the currently created playing sequence number includes: determining whether loss of data occurs between a current slice and a preceding slice; and when it is determined that loss of data occurred, determining that a calibration is required.

Optionally, the player includes a request unit and a playing unit; after a next playing sequence number is determined, the request unit sends a request to the storage module of the server to download the next slice and sends the downloaded slice to the playing unit to play; and when the request unit determines the playing sequence number for the requested slice, the request unit first obtains the latest playing sequence number, and then determines whether pausing occurs based on the playing sequence number of the currently played slice and the latest playing sequence number; when it is determined that the pausing occurred, the request unit determines a next playing sequence number based on a playing delay and the latest playing sequence number; when it is determined that no pausing occurred, the request unit determines a next playing sequence number based on the order of the playing sequence numbers, and sends a request to the server to download the slice corresponding to the next playing sequence number.

Optionally, the request unit calculates a numerical difference between the playing sequence number of the currently played slice and the latest playing sequence umber, and determines whether pausing occurs based on whether the numerical difference is within a preset range.

Optionally, after the file processing module divides the streaming media file into slices, whether each of the slices includes a key frame is recorded.

Optionally, the live streaming system includes a plurality of servers and a plurality of players.

Optionally, the live streaming system includes a plurality of push-stream terminals; and each server is connected to one or more push-stream terminals, respectively.

The streaming media file processing method according to the present disclosure divides the streaming media file into slices according to a time unit, and creates a playing sequence number for each slice based on time data. In the subsequent playing process, the player operates based directly on the playing sequence numbers, and selects suitable slices to play such that when pausing occurs, the player rapidly resumes playing.

In addition, by introducing a calibration step, when the file data is lost in the transmission, the method timely adjusts the playing sequence number such that the correct playing position is located precisely in the subsequent playing process. Thus, the playing request data errors due to loss of data and the incorrect playing sequence number are prevented.

Further, after the streaming media file is divided into slices, each slice that includes a key frame is recorded. When pausing occurs and slice skipping is required, a slice that includes a key frame is facilitated to be quickly identified and played. Thus, the snowy screen symptom when the slice that does not include a key frame is played is prevented, and the user experience is improved.

In the live streaming service, the real-time requirement is important. However, loss of data due to network fluctuations and playing pausing are the problems that require immediate solutions in the live streaming service. The embodiments provided by the present disclosure effectively detect loss of data, take remedy actions accordingly, and rapidly resume from the playing pausing. Thus, the requirement for live streaming service is better satisfied.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts.

DETAILED DESCRIPTION

Reference will now be made in detail to exemplary embodiments of the disclosure, which are illustrated in the accompanying drawings. Those skilled in the art may readily understand other advantages and effects of the present disclosure as described in the specification. The present disclosure may be embodied or practiced in the ways different from the disclosed embodiments. The details described in the specification may be modified or varied for different perspectives and applications without departing from the spirit of the present disclosure. Under a non-conflicting circumstance, the features in the present disclosure may be combined with each other.

It should be noted that the illustrations provided in the disclosed embodiments are intended to provide only the basic concept of the present disclosure. Only the components related to the present disclosure are shown in the schematic drawings rather than the actual number, shape or size of the components in the real life applications. The actual implementation of the various components may be arbitrarily changed in type, quantity and proportion, and the component layout may also be more sophisticated.

Embodiments of the present disclosure are described as follows with references to the accompanying drawings.

Figure 1:
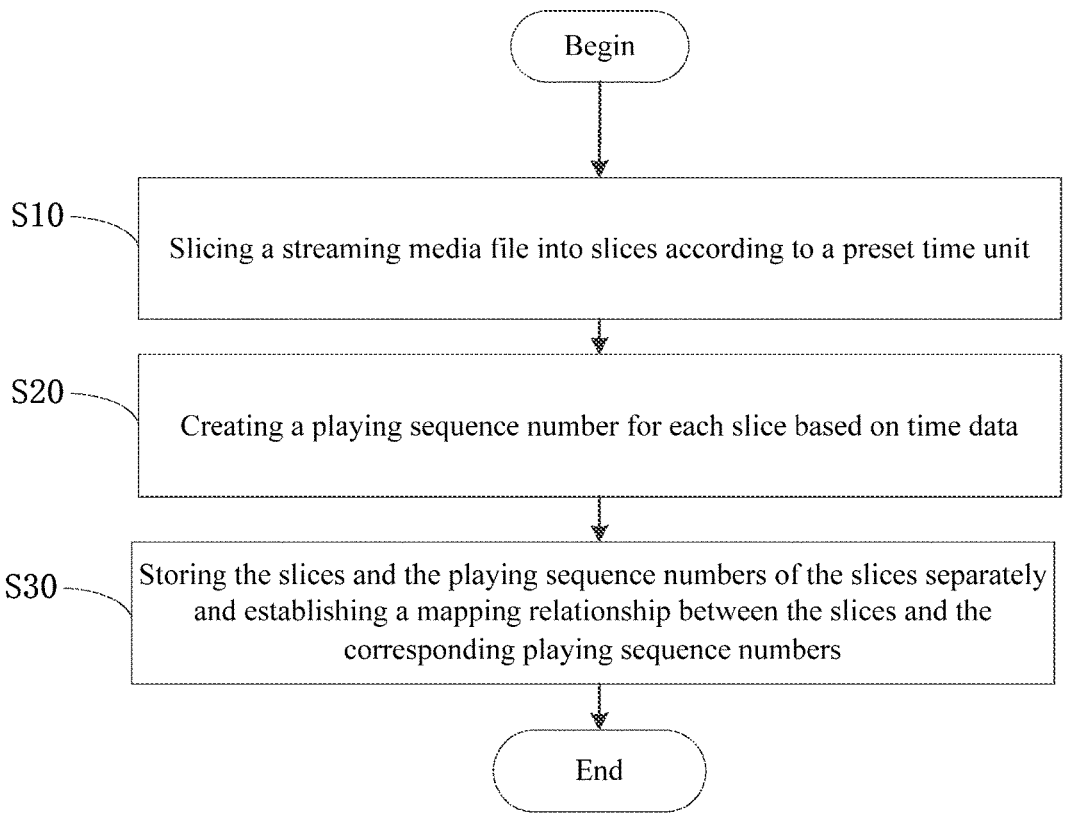
FIG. 1 illustrates a flow chart of an exemplary streaming media file processing method according to the disclosed embodiments.

FIG. 1 illustrates a flow chart of an exemplary streaming media file processing method according to the present disclosure. As shown in FIG. 1, the streaming media file processing method according to the present disclosure may include the following steps.

Step S10: slicing a streaming media file into slices according to a preset time unit.

Specifically, the streaming media file may essentially comprise an audio-video file that is distributed through streaming. The audio-video stream may include consecutive frames. The consecutive frames may include key frames and intermediate frames. Each frame may include a streaming timestamp and a duration to indicate a starting time to play in the audio-video stream and a playing length of the frame. For example, a first frame in a video stream may have a streaming timestamp 0, and a duration 40 ms; a second frame may have a streaming timestamp 40; a third frame may have a streaming timestamp incremented sequentially.

The preset time unit may be used to determine the length of each slice. When the streaming media file is sliced, a slice including a plurality of consecutive frames may be intercepted according to the duration of each frame and the preset time unit. For example, the first frame may have a streaming timestamp 0 and a duration 40 ms. The second frame may have a streaming timestamp 40 and a duration 60 ms. The third frame may have a streaming timestamp 100. When the preset time unit is 100 ms, the slice may include the first frame and the second frame. Therefore, playing time for a single slice may be a sum of durations of all the frames in the slice, which is theoretically equal to the preset time unit.

The preset time unit may be set according to actual requirements. The preset time unit may be a specific value or a range of values, which is not limited by the present disclosure. It should be understood that, because the duration of each frame is determined according to the specific audio-video stream, in the process of slicing, the boundary may not correspond to a frame perfectly. In this case, a rounding method may be set forth to take care of the scenario. For example, a frame closest to the boundary may be selected as the ending frame of the slice. No limitation is imposed by the present disclosure.

Step S20: creating a playing sequence number for the slice based on time data.

Specifically, the time data may include the streaming timestamp of the first frame in the slice. Creating the playing sequence number may include calculating a playing sequence number based on a function. For example, in one embodiment, the calculation function may be:

$$F(x)=t(x)-t(x-1)+F(x-1),$$

where x is the sequence number of a slice, F(x) is the playing sequence number for the slice x, t(x) is the streaming timestamp of the first frame in the slice x, and F(0) is the current system time.

The created playing sequence number may be used to determine the order of playing the slice. The slice playing sequence number created by the method may intuitively reflect the playing order and specific streaming timestamp of the slices. In the subsequent playing process, the playing sequence numbers may be directly used to play the slices. Further, the playing sequence numbers may be used to detect abnormality, which will be described in detail later.

In certain embodiments, the calculation function may be perfected to include weights and tolerance offset such that the created playing sequence numbers may be more realistic. For example, the calculation function may be $$F(x)=At(x)-Bt(x-1)+F(x-1)+C,$$

where A and B are weights, and C is a system tolerance offset. The specific values of A, B, and C may be adjusted according to actual scenario of the system design. No limitation is imposed by the present disclosure.

The present disclosure may use other methods to create the playing sequence numbers. For example, the streaming timestamps may be directly used to create the playing sequence numbers. Other time information may be used as long as the created playing sequence numbers reflect the real-time relationship between the slices.

Because the transmission of the streaming media file may be affected by network fluctuation and loss of data may occur, when the occurrence of loss of data is not detected timely, the playing sequence number creation may be affected such that, in the subsequent playing process, the playing sequence numbers may not be obtained correctly.

In one embodiment, when creating a playing sequence number, the method may first determine whether a calibration is required. When it is determined that a calibration is required, the playing sequence number of the current slice may be created according to the current system time. When it is determined that a calibration is not required, the playing sequence number of the current slice may be created as previously described.

Determining whether a calibration is required includes determining whether loss of data occurs between the current slice and the preceding slice. When loss of data occurs, a calibration may be required.

Specifically, the streaming timestamp of frame may be used to determine whether loss of data occurs. Under normal circumstances, the streaming timestamp difference between adjacent frames of adjacent slices may be the duration of the preceding frame. Frame durations may often be within a reasonable range. By determining whether the streaming timestamp difference between the first frame of the current slice and the last frame of the preceding slice is within a reasonable range, whether loss of data occurs between the current slice and the preceding slice may be determined. In certain other embodiments, whether loss of data occurs may be determined by determining whether the streaming timestamp difference between the first frames of adjacent slices is within a reasonable range.

After it is determined that the loss of data has occurred, when the playing sequence number is still calculated based on the original method, a gap may appear between the playing sequence number of the current slice and the playing sequence number of the preceding slice. In the subsequent playing process, a request may fall into the gap, and no resource may be available to respond to the request. Thus, after it is determined that the loss of data has occurred, a calibration may be required for creating the playing sequence number to fill the gap and to avoid the scenario that no resource is available to respond to certain request. Because the creation of the playing sequence number is based on the system time and the slice playing time, the current system time may be directly used to calibrate the current playing sequence number.

Step S30: storing the slices and the playing sequence numbers of the slices separately and establishing a mapping relationship between the slices and the corresponding playing sequence numbers.

Figure 2:
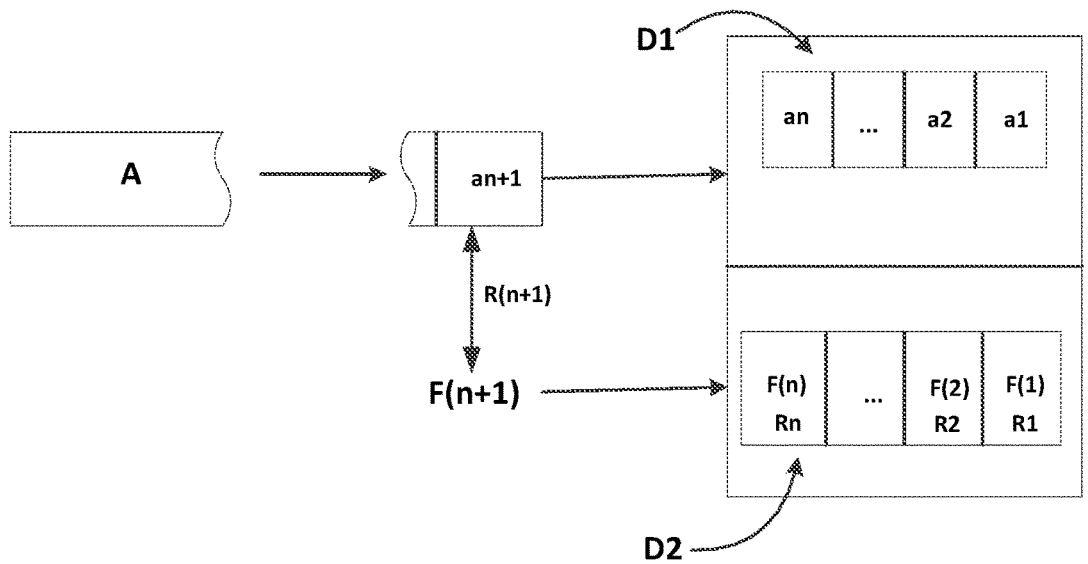
FIG. 2 illustrates a schematic diagram of an exemplary streaming media file processing process according to the disclosed embodiments.

FIG. 2 illustrates a schematic diagram of an exemplary streaming media file processing process according to the present disclosure. As shown in FIG. 2, after being processed in the steps S10 and S20, the streaming media file A may be sliced into a plurality of slices a1, a2, . . . , an, a(n+1), . . . , each slice may have a corresponding playing sequence number, such as F(1), F(2), . . . , F(n), F(n+1), . . . , and the slices and the corresponding playing sequence numbers are stored in different storing sections D1 and D2, respectively. Mapping relationship R1, R2, Rn, R(n+1) may be established between the slices and the corresponding playing sequence numbers.

When a slice playing is requested, a player may first determine the playing sequence number of the requested resource, identify the corresponding slice through the mapping relationship, and download the slice. Because it takes time to download the slice, separately storing the slice and the corresponding playing sequence number in different sections may allow independent operations on the slice and the corresponding playing sequence number. Thus, when multiple requests occur at the same time, wait time may be reduced.

The streaming media file processing method including the above-described steps S10 through S30 may slice the streaming media file into slices based on the time characteristics, create the corresponding playing sequence numbers, and timely calibrate the playing sequence numbers in response to loss of data, such that abnormality in the playing process may be handled directly based on the playing sequence numbers. The playing method of the streaming media file that has been processed according to the steaming media file processing method is described in the following.

Figure 3:
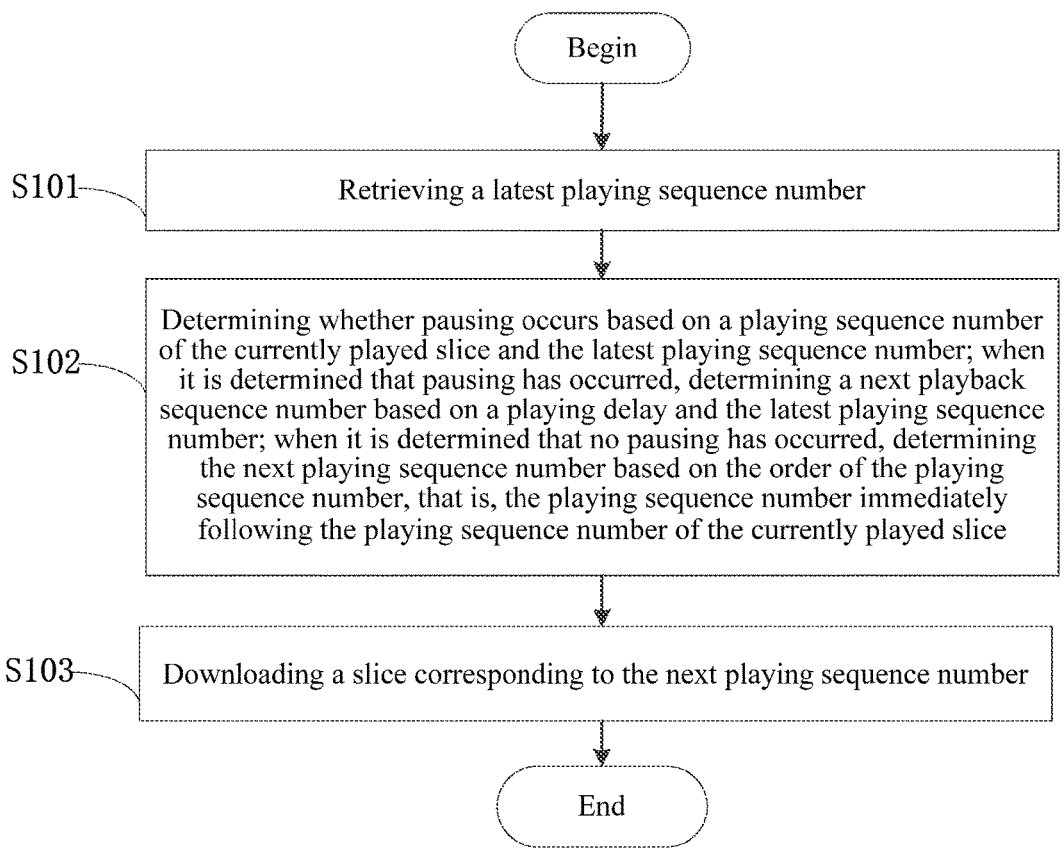
FIG. 3 illustrates a flow chart of an exemplary streaming media file playing method according to the disclosed embodiments.

FIG. 3 illustrates a flow chart of an exemplary streaming media file playing method according to the present disclosure. As shown in FIG. 3, the playing method of the streaming media file may include the following steps.

Step S101: retrieving a latest playing sequence number, where the latest playing sequence number is the playing sequence number that is most recently created and stored.

Step S102: determining whether pausing has occurred based on a playing sequence number of the currently played slice and the latest playing sequence number; when it is determined that pausing has occurred, determining a next playing sequence number based on a playing delay and the latest playing sequence number; when it is determined that no pausing has occurred, determining the next playing sequence number based on the order of the playing sequence number, that is, the playing sequence number immediately following the playing sequence number of the currently played slice.

Specifically, based on the transmission characteristics of the streaming media file, the player may download a subsequent slice for playing at the same time as the current slice is played. In an ideal network environment, the most recently created playing sequence number may be the playing sequence number of the slice for playing next. However, in a real-life network environment, the transmission network may have fluctuations such that the player may not be able to obtain resources timely, and image pausing may occur.

To address the issue, the player may first determine whether the current streaming is pausing to decide the playing sequence number of the slice for playing next. Specifically, determining whether pausing occurs based on the playing sequence number of the currently played slice and the latest playing sequence number may include calculating a numerical difference between the playing sequence number of the currently played slice and the latest playing sequence number, and determining whether pausing occurs based on whether the numerical difference is within a preset range.

Because the playing sequence numbers are created based on time data, the playing sequence numbers may be directly used to determine a playing time for a slice. Theoretically, the numerical difference between the playing sequence number of the currently played slice and the latest playing sequence number may be equal to the playing time of the currently played slice, that is, the preset time unit when the streaming media file is sliced. Further, inevitable playing delay and system tolerance may be accommodated. When the numerical difference is within a reasonable preset range (e.g., the playing time of the slice+playing delay+system tolerance), the currently played slice may be successfully played, and no pausing may occur. Otherwise, the occurrence of pausing may be determined. The playing delay may be the delay in time between the image played at the client terminal and the real-time image at the push-stream terminal due to the time required for processing and transmitting data from the push-stream terminal to the client terminal in live streaming in addition to the delay caused by the equipment reason of the player itself.

When it is determined that no pausing has occurred, the player may directly determine that the next playing sequence number is the sequence number immediately following the currently played sequence number in the record.

When it is determined that the pausing has occurred, to ensure the real-time playing of the images received by the user, the player may skip the delayed slices due to pausing to ensure the real-time playing of the current images. Thus, the slice for playing next may be adjusted. The next playing sequence number may be determined based on the playing delay and the latest playing sequence number. Further, a system tolerance may be accommodated, that is, the next playing sequence number is equal to the latest playing sequence number minus a sum of the playing delay and the system tolerance.

In one embodiment, in the step S20, after the streaming media file is sliced into slices, each slice that includes a key frame may be recorded. When pausing occurs and image skipping is required, after the next playing sequence number is determined, the player may again determine whether the slice corresponding to the playing sequence number includes a key frame. When it is determined that no key frame is included, a playing sequence number of an adjacent slice that includes a key frame may be selected to be the next playing sequence number. Thus, snowy screen symptom caused by jumping to a slice that does not include a key frame may be avoided.

Step S103: downloading a slice corresponding to the next playing sequence number.

After the next playing sequence number is determined in the step S102, the player may download the slice that corresponds to the next playing sequence number, and may play the downloaded slice after the current slice is completed.

Accordingly, the streaming media file processing method according to the present disclosure may slice the streaming media file into slices based on a time unit, and may create a playing sequence number for each slice based on time data. In the subsequent playing process, the player may operate based directly on the playing sequence numbers, and may select suitable slices to play such that when pausing occurs, the player may rapidly resume playing.

In addition, by introducing a calibration step, when the file data is lost in the transmission, the method may timely adjust the playing sequence number such that the correct playing position may be located precisely in the subsequent playing process. Thus, the playing request data errors due to loss of data and the disorder of the playing sequence numbers may be prevented.

Further, after the streaming media file is sliced into slices, each slice that includes a key frame may be recorded. When pausing occurs and slice skipping is required, the slice that includes a key frame may be facilitated to be quickly identified and played. Thus, the snowy screen symptom when the slice that does not include a key frame is played may be prevented, and the user experience may be improved.

In the live streaming service, the real-time requirement is important. However, loss of data due to network fluctuations and playing pausing are the problems that require immediate solutions in the live streaming service. The embodiments provided by the present disclosure effectively detect loss of data, take remedy actions accordingly, and rapidly resume from the playing pausing. Thus, the requirement for live streaming service is better satisfied.

In addition, the present disclosure also provides a live streaming system.

Figure 4:
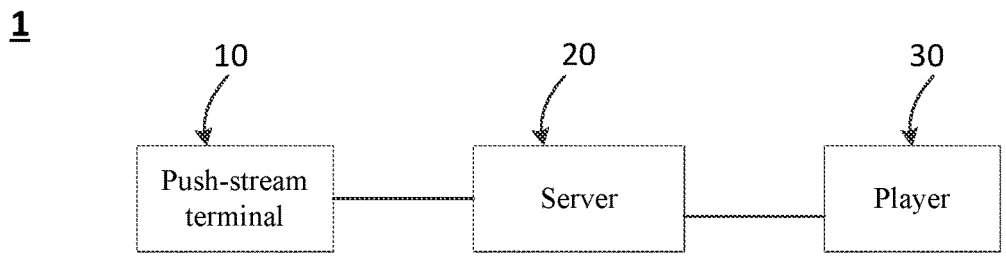
FIG. 4 illustrates a schematic diagram of an exemplary live streaming system according to the disclosed embodiments.

FIG. 4 illustrates a schematic diagram of an exemplary live streaming system according to the present disclosure. As shown in FIG. 4, the live streaming system 1 may include a push-stream terminal 10, a server 20, and a player 30. The server 20 may be connected to the push-stream terminal 10 and the player 30, respectively.

Specifically, the push-stream terminal 10 may be the source terminal of the audio-video file. In a specific live streaming scenario, the push-stream terminal 10 may be a specific host terminal, or a streaming platform server for a host terminal. In a live streaming, the push-stream terminal 10 may continuously generate the audio-video file, and may transfer the streaming media file of the audio-video stream through streaming to the server 20.

The server 20 may receive the streaming media file from the push-stream terminal 10, and may slice the streaming media file into slices.

Figure 5:
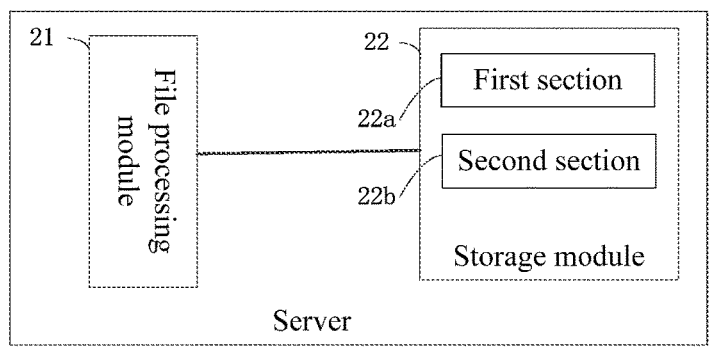
FIG. 5 illustrates a schematic diagram of a server in an exemplary live streaming system according to the disclosed embodiments.

FIG. 5 illustrates a schematic diagram of a server of an exemplary live streaming system according to the present disclosure. As shown in FIG. 5, the server 20 may include a file processing module 21 and a storage module 22.

The file processing module 21 may receive the streaming media file, slice the streaming media file into slices according to a preset time unit, create a playing sequence number for each slice based on time data, establish a mapping relationship between each slice and the corresponding playing sequence number, and respectively send the slices, the corresponding playing sequence numbers, and the mapping relationship to the storage module 22.

Specifically, as previously described, the streaming media file may essentially be an audio-video file that is distributed through streaming. The audio-video stream may include consecutive frames. The consecutive frames may include key frames and intermediate frames. Each frame may include a streaming timestamp and a duration to indicate a starting time to play in the audio-video stream and a playing length.

Slicing the streaming media file by the file processing module 21 into slices according to a preset time unit may include obtaining a duration of each frame in the streaming media file, and obtaining every slice by slicing the streaming media file sequentially based on the frame durations and the preset time unit.

The preset time unit may be set according to actual requirements. The preset time unit may be a specific value or a range of values, not limited by the present disclosure. It should be understood that, because the duration of each frame is determined according to the specific audio-video stream, in the process of slicing, the boundary may not correspond to a frame perfectly. In this case, a rounding method may be set forth to take care of such scenario. For example, a frame closest to the boundary may be selected as the ending frame of the slice. No limitation is imposed by the present disclosure At the same time as the file processing module 21 slices and obtains the streaming media file, the file processing module 21 may create the corresponding playing sequence numbers based on time data.

Specifically, creating a playing sequence number by the file processing module 21 for each slice may include applying time data into a function to calculate a playing sequence number. The time data may include the streaming timestamp for the first frame in the current slice. For example, in one embodiment, the calculation function may be:

$$F(x)=t(x)-t(x-1)+F(x-1),$$

where x is the sequence number of a slice, F(x) is the playing sequence number for the slice x, t(x) is the streaming timestamp of the first frame in the slice x, and F(0) is the current system time.

The created playing sequence number may be used to determine an order of playing the slice. The slice playing sequence number created by the file processing module 21 may intuitively reflect the playing order and specific streaming timestamp of the slices. In the subsequent playing process, the playing sequence numbers may be directly used to play the slices. Further, the playing sequence numbers may be used to detect abnormality, which will be described in detail later.

In certain embodiments, the calculation function may be perfected to include weights and a system tolerance offset such that the created playing sequence numbers may be more realistic. For example, the calculation function may be $$F(x)=At(x)-Bt(x-1)+F(x-1)+C,$$

where A and B are weights, and C is a system tolerance offset. The specific values of A, B, and C may be adjusted according to actual scenario of the system design. No limitation is imposed by the present disclosure.

It should be noted that, the present disclosure may use other methods to create the playing sequence numbers. For example, the streaming timestamps may be directly used to create the playing sequence numbers. Other time information may be used as long as the created playing sequence numbers reflect the real-time relationship between each of the slices.

Because the transmission of the streaming media file may be affected by network fluctuations and loss of data may occur, when the occurrence of loss of data is not detected timely, the playing sequence number creation may be affected such that, in the subsequent playing process, the playing sequence numbers may not be obtained correctly.

In one embodiment, when creating a playing sequence number, the file processing module 21 may first determine whether a calibration is required. When it is determined that a calibration is required, the playing sequence number of the current slice may be created according to the current system time. When it is determined that a calibration is not required, the playing sequence number of the current slice may be created as previously described.

Determining whether a calibration is required includes determining whether loss of data occurs between the current slice and the last slice. When loss of data occurs, a calibration may be required.

Specifically, the streaming timestamp of frame may be used to determine whether loss of data occurs. Under normal circumstances, the streaming timestamp difference between adjacent frames of adjacent slices may be the duration of the preceding frame. Frame durations may often be within a reasonable range. By determining whether the streaming timestamp difference between the first frame of the current slice and the last frame of the preceding slice is within a reasonable range, whether loss of data occurs between the current slice and the preceding slice may be determined. In other embodiments, whether loss of data occurs may be determined by determining whether the streaming timestamp difference between the first frames of adjacent slices is within a reasonable range.

After it is determined that the loss of data has occurred, when the playing sequence number is still calculated based on the original method, a gap may appear between the playing sequence number of the current slice and the playing sequence number of the preceding slice. In the subsequent playing process, a request may fall into the gap, and no resource may be available to respond to the request. Thus, after it is determined that the loss of data has occurred, a calibration may be required for creating the playing sequence number to fill the gap and to avoid the scenario that no resource is available to respond to certain request. Because the creation of the playing sequence number is based on the system time and the slice playing time, the current system time may be directly used to calibrate the current playing sequence number.

The storage module 22 may receive data sent from the file processing module 21, store the slices in a first section 22a, and store the corresponding playing sequence numbers and mapping relationship in a second section 22b.

The player 30 may be used to play the streaming media file. In a specific live streaming scenario, the player 30 is a client terminal. After a user requests for a live streaming program, the player 30 may obtain a playing resource from the server 20 according to the user request.

Figure 6:
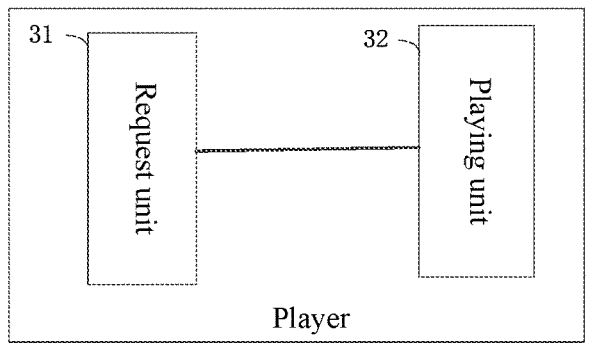
FIG. 6 illustrates a schematic diagram of a player in an exemplary live streaming system according to the disclosed embodiments.

Referring to FIG. 6 and FIG. 5 simultaneously, FIG. 6 illustrates a schematic diagram of a player of an exemplary live streaming system according to the present disclosure. As shown in FIG. 5 and FIG. 6, the player 30 may include a request unit 31 and a playing unit 32.

The request unit 31 may retrieve and select the playing sequence number of the user requested program from the second section 22b of the storage module 22 on the server 20 based on the user request, download the slice for playing from the first section 22a of the storage module 22 based on the playing sequence number and the mapping relationship, and send the downloaded slice to the playing unit 32 for playing.

In one embodiment, the request unit 31 may retrieve the latest playing sequence number from the second section 22b. The latest playing sequence number may be the most recently created and stored playing sequence number. The player 30 may determine whether pausing occurs based on the playing sequence number of the currently played slice and the latest playing sequence number. When it is determined that the pausing has occurred, the player 30 may determine a next playing sequence number based on the playing delay and the latest playing sequence number. When it is determined that no pausing has occurred, the player 30 may determine a next playing sequence number based on the order of the playing sequence number of the second section 22b, that is, the playing sequence number immediately following the playing sequence number of the currently played slice.

Specifically, based on the transmission characteristics of the streaming media file, the player 30 may download next slice for playing at the same time as the current slice is played. In an ideal network environment, the most recently created playing sequence number may be the playing sequence number of the slice for playing next. However, in a real life network environment, the transmission network may have fluctuations such that the player may not be able to obtain resource timely, and image pausing may occur.

To address the issue, the player 30 may first determine whether the current streaming is pausing to decide the playing sequence number of the slice for playing next. Specifically, determining whether pausing occurs based on the playing sequence number of the currently played slice and the latest playing sequence number may include calculating a numerical difference between the playing sequence number of the currently played slice and the latest playing sequence number, and determining whether pausing occurs based on whether the numerical difference is within a preset range.

Because the playing sequence numbers are created based on time data, the playing sequence numbers may be directly used to determine a playing time for a slice. Theoretically, the numerical difference between the playing sequence number of the currently played slice and the latest playing sequence number may be equal to the playing time of the currently played slice, that is, the preset time unit when the streaming media file is sliced. Further, inevitable playing delay and system tolerance may be accommodated. When the numerical difference is within a reasonable preset range (e.g., the playing time of the slice+playing delay+system tolerance), the currently played slice may be played successfully, and no pausing may occur. Otherwise, the occurrence of pausing may be determined. The playing delay may be the delay in time between the image played at the client and the real-time image at the streaming host due to the time required for processing and transmitting data from the streaming host to the client in the live streaming in addition to the delay caused by the equipment reason of the player itself.

When it is determined that no pausing occurred, the player 30 may directly determine that the next playing sequence number is the sequence number immediately following the currently played sequence number in the record.

When it is determined that the pausing has occurred, in order to ensure the real-time playing of the images received by the user, the player 30 may skip the delayed slices due to pausing to ensure the real-time playing of the current images. Thus, the slice for playing next may be adjusted. The next playing sequence number may be determined based on the playing delay and the latest playing sequence number. Further, a system tolerance may be accommodated, that is, the next playing sequence number is equal to the latest playing sequence number minus a sum of the playing delay and the system tolerance.

In one embodiment, after the file processing module 21 slices the streaming media file into slices, each slice that includes a key frame may be recorded. When pausing occurs and image skipping is required, after the next playing sequence number is determined, the player 30 may determine again whether the slice corresponding to the playing sequence number includes a key frame. When it is determined that no key frame is included, a playing sequence number of an adjacent slice that includes a key frame may be selected to be the next playing sequence number. Thus, snowy screen symptom caused by jumping to a slice that does not include a key frame may be avoided.

In the live streaming system as shown in FIG. 4, the data transmission between the push-stream terminal, the server, and the player and the respective functions may be illustrated. In a live streaming, the push-stream terminal may continuously generate the audio-video file, and may transfer the audio-video streaming media file to the server in real-time. The server may receive the streaming media file from the push-stream terminal, slice the streaming media file into slices, and create a playing sequence number for each slice based on time information. When creating a playing sequence number, the server may first determine whether loss of data occurs. When it is determined that loss of data has occurred, the playing sequence number may be adjusted by the current system time to avoid the situation that the player requests the lost data and gets no response. The player may sequentially request and download the slices from the server, and may play the downloaded slices. Each time when requesting and downloading a slice, the player may determine whether pausing occurs based on the playing sequence number. When it is determined that the pausing has occurred, the player may timely skip to avoid extensive playing delay that makes the playing not in real-time.

Figure 7:
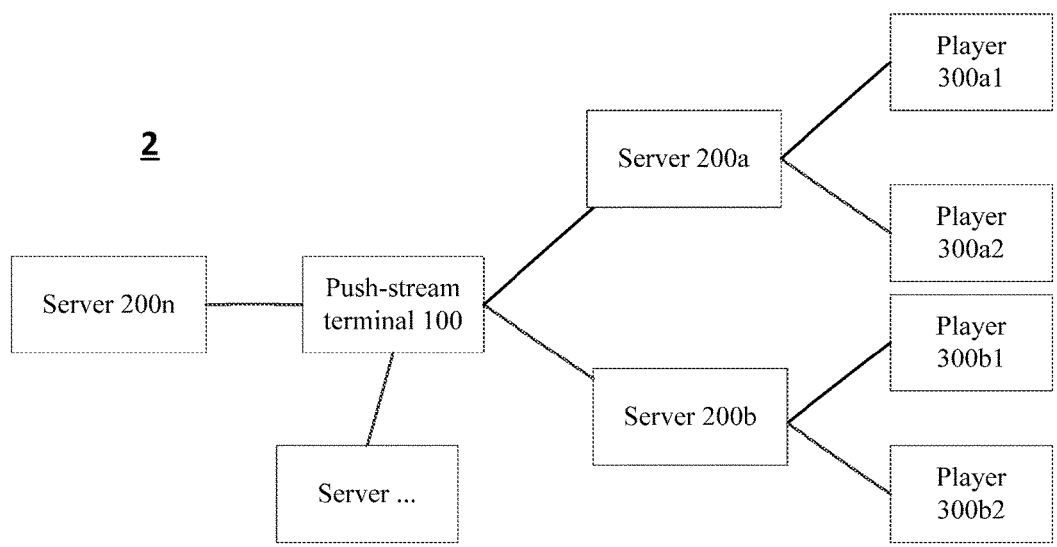
FIG. 7 illustrates a schematic diagram of another exemplary live streaming system according to the disclosed embodiments.

FIG. 7 illustrates a schematic diagram of another exemplary live streaming system according to the present disclosure. As shown in FIG. 7, the live streaming system 2 may include a push-stream terminal 100, a plurality of servers 200 (200a, 200b, . . . , 200n as shown in the drawing), and a plurality of players 300 (300a1, 300a2, 300b1, 300b2, . . . , as shown in the drawing).

The server 200a, 200b, . . . , 200n may be connected to the push-stream terminal 100. The players 300a1, 300a2 may be connected to the server 200a. The player 300b1, 300b2 may be connected to the server 200b. In one embodiment, the players may obtain playing resources through the connections to the corresponding servers. The servers may obtain the program resources of the push-stream terminal through the connections to the push-stream terminal. The push-stream terminal, the servers, and the players may have identical structures and functions as the push-stream terminal, the server, and the player as shown in FIG. 4. Thus, the description is not repeated.

In other embodiments, the relationship between the push-stream terminals and the servers and the relationship between the servers and the players may be a many-to-many relationship. That is, one push-stream terminal maybe connected to multiple servers, one server may be connected to multiple push-stream terminals, or one player may be connected to multiple servers. The specific arrangements may be determined according to the actual business requirement and equipment configuration. No limitation is imposed by the present disclosure.

The system embodiments described above are merely for illustrative purpose. The units described as separated parts may or may not be physically detached. The parts displayed as units may or may not be physical units, i.e., may be located at one place, or distributed at a plurality of network units. Based on the actual needs, a part or all of the modules may be selected to achieve the objective of the embodiments. Those ordinarily skilled in the art may understand and implement the disclosed embodiments without contributing creative labor.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) having one or more processors to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc., shall fall within the scope of the present disclosure.

What is claimed is:

1. A streaming media file processing method, comprising: slicing a streaming media file into slices according to a preset time unit; creating a playing sequence number for each slice based on time data, wherein the playing sequence number is configured to determine an order of playing the slices, and the time data includes a streaming timestamp of a first frame in the slice; storing the slices and the playing sequence numbers of the slices into two separate sections of a storage module; and establishing a mapping relationship between the slices and the corresponding playing sequence numbers, wherein creating a playing sequence number for the slice comprises: determining a time difference between a streaming timestamp of a first frame of a current slice and a streaming timestamp of a last frame of a preceding slice; in response to determining that the time difference is not within a range, determining that loss of data has occurred and a calibration is required for a currently created playing sequence number; when it is determined that a calibration is required, creating the playing sequence number for the current slice according to a current system time and one frame duration; and when it is determined that no calibration is required, applying the time data into a predetermined function to calculate the playing sequence number based on the current system time and the streaming timestamp of the first frame in the slice.

2. The method according to claim 1, wherein slicing the streaming media file into slices according to the preset time unit includes:
   obtaining a duration for each frame in the streaming media file; and
   based on the duration and the preset time unit, obtaining the slice by slicing the streaming media file.

3. The method according to claim 1, wherein determining whether calibration is required for currently created playing sequence number includes:
   determining whether loss of data occurs between a current slice and a preceding slice; and
   when it is determined that loss of data has occurred, determining that a calibration is required.

4. The method according to claim 1, wherein playing the steaming media file includes:
   retrieving a latest playing sequence number;
   determining whether pausing occurs based on a playing sequence number of the currently played slice and the latest playing sequence number;
   when it is determined that the pausing has occurred, determining a next playing sequence number based on a playing delay and the latest playing sequence number;
   when it is determined that no pausing has occurred, determining the next playing sequence number based on the order of playing sequence numbers; and
   downloading a slice corresponding to the next playing sequence number.

5. The method according to claim 4, wherein determining whether pausing occurs includes:
   calculating a numerical difference between the playing sequence number of the currently played slice and the latest playing sequence number; and
   determining whether pausing occurs by determining whether the numerical difference is within a preset range.

6. The method according to claim 1, after the streaming media file is sliced into slices, further including:
   recording whether each of the slices includes a key frame.

7. The method according to claim 1, wherein the predetermined function is a playing sequence number of a current slice, a streaming timestamp of a first frame in the current slice, a streaming timestamp of a first frame in a previous slice immediately precedent of the current slice, and a playing sequence number of the previous slice immediately precedent of the current slice.

8. The method according to claim 7, wherein the predetermined function is further determined based on adjustable weights and a system tolerance offset.

9. The method according to claim 1, wherein the range is determined based on a duration of a frame.

10. A live streaming system, comprising a push-stream terminal, a server, and a player, wherein: the push-stream terminal is configured to transfer a streaming media file to the server; a file processing module of the server is configured to: receive the streaming media file, slice the received streaming media file into slices according to a present time unit, create a playing sequence number for each slice based on time data, wherein the playing sequence number is configured to determine an order of playing the slices, and the time data includes a streaming timestamp of a first frame in the slice, establish mapping relationship between the slices and the corresponding playing sequence numbers, and respectively send the slices, the playing sequence numbers of the slices, and the mapping relationship to a storage module of the server; the storage module of the server is configured to: store the slices in a first section, and the playing sequence numbers of the slices and the mapping relationship in a second section; and the player is configured to: obtain and select the playing sequence number from the second section, and download and play a slice from the first section based on the playing sequence number and the mapping relationship, wherein the file processing module of the server is further configured to: determine a time difference between a streaming timestamp of a first frame of a current slice and a streaming timestamp of a last frame of a preceding slice; in response to determining that the time difference is not within a range, determine that loss of data has occurred and a calibration is required for a currently created playing sequence number; when it is determined that a calibration is required, create the playing sequence number for the current slice according to a current system time and one frame duration; and when it is determined that no calibration is required, apply the time data into a predetermined function to calculate the playing sequence number based on the current system time and the streaming timestamp of the first frame in the slice.

11. The live streaming system according to claim 10, wherein slicing the streaming media file into slices by the file processing module of the server according to a present time unit includes:
   obtaining a duration for each frame in the steaming media file; and
   obtaining the slice by slicing the streaming media file based on the frame durations and the preset time unit.

12. The live streaming system according to claim 10, wherein determining by the file processing module whether a calibration is required for the currently created playing sequence number includes:
   determining whether loss of data occurs between a current slice and a preceding slice; and
   when it is determined that loss of data has occurred, determining that a calibration is required.

13. The live streaming system according to claim 10, wherein:
   the player includes a request unit and a playing unit;
   after a next playing sequence number is determined, the request unit sends a request to the storage module of the server to download the next slice and sends the downloaded slice to the playing unit to play; and
   when the request unit determines the playing sequence number for the requested slice, the request unit first obtains the latest playing sequence number, and then determines whether pausing occurs based on the playing sequence number of the currently played slice and the latest playing sequence number; when it is determined that the pausing has occurred, the request unit determines a next playing sequence number based on a playing delay and the latest playing sequence number; when it is determined that no pausing has occurred, the request unit determines a next playing sequence number based on the order of the playing sequence numbers, and sends a request to the server to download the slice corresponding to the next playing sequence number.

14. The live streaming system according to claim 13, wherein:
   the request unit calculates a numerical difference between the playing sequence number of the currently played slice and the latest playing sequence umber, and determines whether pausing occurs based on whether the numerical difference is within a preset range.

15. The live streaming system according to claim 10, wherein:
after the file processing module slices the streaming media file into slices, whether each of the slices includes a key frame is recorded.

16. The live streaming system according to claim 10, wherein:
the live streaming system includes a plurality of servers and a plurality of players.

17. The live streaming system according to claim 16, wherein:
the live streaming system includes a plurality of push-stream terminals; and
each server is connected to one or more push-stream terminals, respectively.

\* \* \* \* \*